US009298482B2

(12) United States Patent  
Sachindran et al.

(10) Patent No.: US 9,298,482 B2  
(45) Date of Patent: Mar. 29, 2016

(54) PLUG-IN BASED TEMPLATIZATION FRAMEWORK FOR AUTOMATING THE CREATION OF OPEN VIRTUALIZATION FORMAT VIRTUAL APPLIANCES

(75) Inventors: Narendran Sachindran, C.R. Park (IN); Alberto Giammaria, Austin, TX (US); Manish Gupta, Neb Sarai (IN); Manish Sethi, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 13/323,721

(22) Filed: Dec. 12, 2011

(65) Prior Publication Data

US 2013/0152080 A1 Jun. 13, 2013

(51) Int. Cl.  
*G06F 9/46* (2006.01)  
*G06F 9/445* (2006.01)  
*G06F 9/455* (2006.01)

(52) U.S. Cl.  
CPC ........ *G06F 9/44526* (2013.01); *G06F 9/45558* (2013.01); *G06F 2009/45562* (2013.01)

(58) Field of Classification Search  
None  
See application file for complete search history.

(56) References Cited

U.S. PATENT DOCUMENTS

| 7,856,440 B2 | 12/2010 | Alpern et al. | |
| 8,200,620 B2 * | 6/2012 | Akiyama et al. | 707/609 |
| 2004/0177352 A1 | 9/2004 | Narayanaswamy et al. | |
| 2006/0242626 A1 * | 10/2006 | Pham et al. | 717/121 |
| 2008/0189405 A1 * | 8/2008 | Zarenin et al. | 709/224 |
| 2009/0249279 A1 | 10/2009 | Bourdon | |
| 2009/0300604 A1 * | 12/2009 | Barringer | 717/178 |
| 2010/0042994 A1 | 2/2010 | Vasilevsky et al. | |
| 2011/0004676 A1 | 1/2011 | Kawato | |
| 2011/0107330 A1 * | 5/2011 | Freundlich et al. | 718/1 |

OTHER PUBLICATIONS

Barclay, Chris, "Oracle VM: Open Source Virtualization", 2010, 32 pages.  
Kecskemeti, Gabor et al., "Automatic Service Deployment Using Virtualisation", Feb. 2008, 8 pages.  
Machida, F. et al., "Renovating Legacy Distributed Systems Using Virtual Appliance With Dependency Graph", Oct. 2010, 8 pages.  
Vukmanović, Duško, "Java Virtualization With Weblogic Suite", 2010, 26 pages.

\* cited by examiner

*Primary Examiner* — Wissam Rashid  
(74) *Attorney, Agent, or Firm* — DeLizio Law, PLLC

(57) ABSTRACT

A plug-in-based templatization framework for automating the creation of open virtualization framework (OVF) virtual appliance (VA) is provided. According to one embodiment, a framework is stored which comprises a plurality of product-specific add-ons. Each of the plurality of product-specific add-ons comprises a discovery element, an activation logic template element, an open virtualization package envelope template element. The plurality of product-specific add-ons are executed against a first virtual composite application instance while said the virtual composite application instance is executing in a first virtualization platform environment to automatically generate an open virtualization package template. A second virtual composite application instance is then deployed within a second virtualization platform environment utilizing the open virtualization package template.

16 Claims, 7 Drawing Sheets

```
< ActivationLogicPublisher name="Db2InstancePublisher" type="Db2Instance">

<variable name="name" path="@Name"/>
    <variable name="port" path="accessedVia[BindAddress].@Port"/>
    <variable name="home" path="@Home"/>
    <variable name="owner" path="ownedBy.@UserName"/>
    <update updatedAttributes="{port}">
        <prerequisite stopped="{this}"/>
        <command runtime="perl" script="db2UpdatePort.pl">
          <parameters>
              <parameter name="db2InstanceOwner" value="{owner}"/>
              <parameter name="db2InstanceHome" value="{home}"/>
              <parameter name="db2InstanceName" value="{name}"/>
              <parameter name="db2InstancePort" value="{port}"/>
          </parameters>
        </command>
    </update>
</ActivationLogicPublisher>
```

FIG. 5

```
<OVFProductSectionPublisher
    xmlns:ovf="http://schemas.dmtf.org/ovf/envelope/1"
    imports="app.db.db2.*,sys.*">
    <ForEach-ModelObject
      path="~runsOn.~runsOn[app.db.db2.Db2Instance]">
      <Variable name="productName" path="@ProductName" />
      <Variable name="version" path="@ProductVersion" />
      <Variable name="name" path="@Name"/>
      <ovf:ProductSection ovf:class="com.ibm.db2">
        <ovf:Info>
            {productName}, Version - {version}
        </ovf:Info>
        <ovf:Product>{productName}</ovf:Product>
        <ovf:Version>{version}</ovf:Version>
        <ovf:FullVersion>{version}</ovf:FullVersion>
        <ForEach-ModelObject
path="accessedVia[net.BindAddress]">
            <Variable name="port" path="@Port" />
            <ovf:Property modelObjectAttributePath="@Port"
        ovf:key="Port" ovf:type="uint16"
        ovf:userConfigurable="true"
            ovf:value="{Port}">
            </ovf:Property>
        </ForEach-ModelObject>
    </ForEach-ModelObject>
</OVFProductSectionPublisher>
```

FIG. 6

PLUG-IN BASED TEMPLATIZATION FRAMEWORK FOR AUTOMATING THE CREATION OF OPEN VIRTUALIZATION FORMAT VIRTUAL APPLIANCES

BACKGROUND

Embodiments of the inventive subject matter generally relate to the electrical, electronic, and computer arts, and, more particularly, to the field of composite application or appliance virtualization, still more particularly, embodiments of the inventive subject matter related to a plug-in-based templatization framework for automating the creation of open virtualization framework (OVF) virtual appliance.

Virtualization provides the capability to create a virtual representation of a logical or physical element or device. With the advent of multi-tasking processing elements in computers and other data handling systems, computer system hardware was virtualized to an extent enabling multiple user applications to run concurrently. Subsequently, a computer's supervisor state was virtualized, allowing multiple (and eventually disparate) operating systems (OSs) to be run concurrently in separate "virtual machine" contexts. A virtual machine is a software implementation of data handling system or other machine, created using software emulation, hardware virtualization, or a combination of the two and which presents an interface (e.g., to a user, an application, a communications network, other data handling systems, etc.) of a physical machine implementation. Virtual machines have a number of advantages over conventional physical data handling systems, including the ability to provide multiple OS environments to co-exist on a single physical data handling system, to provide an instruction set architecture (ISA) that differs from that provided by the underlying physical data handling system, as well as enhanced provisioning, maintenance, high availability (HA), backup, and disaster recovery capabilities.

More recently, virtualization has been expanded beyond individual machines or systems to encompass multi-system solutions. Just as physical or hardware "appliances" have been created in recent years to ease the deployment of solutions comprising a number of complex and highly-configurable software products (e.g., web servers, application servers, access control (authentication/authorization) servers, back-end databases, etc.) more recently "virtual appliances" have been created providing similar benefits in the virtualized platform and/or "cloud" context. Virtual Appliances comprise a software stack (operating system, applications, middleware, etc.) designed to run on a virtual machine platform (e.g., a type 1 or type 2 hypervisor). Virtual appliances allow solution providers to customize the execution environment for component applications and virtual machines, customize configuration parameters and manage software and operating system updates. Consequently, although simpler to deploy than conventional bespoke solutions, virtual appliance require extensive knowledge of operating system and software application parameters of their creators.

In an effort to reduce the effort required to manual create and deploy virtual appliances (and virtual machines for that matter) a number of existing techniques have been implemented. Virtual machine/appliance "templates" provide partially constructed virtual elements which may then be further customized or configured in situ. So called "cloning" allows duplicate virtual machines/appliances to be created such that configuration information which is unique to a deployment environment can be overwritten with new information where required. Another recent technique to simplify virtual appliance deployment is the utilization of the Open Virtualization Format (OVF) specification for virtual appliance packaging.

OVF is a virtualization-platform/hypervisor-neutral, extensible and open specification for the packaging and distribution of virtual appliances composed of one or more virtual machines. Much like software package management systems automate the process of installing, upgrading, configuring, and removing software packages from an operating system environment, deployment tools which are compliant with the OVF specification ease VA deployment in the virtualization platform context. While OVF-compliant tools have a number of significant benefits, such tools still require extensive OS environment and application knowledge and labor-intensive manual configuration which frequently leads to configuration errors and unnecessary expense.

SUMMARY

According to one or more embodiments of the inventive subject matter, a method and computer program product is provided for automating the creation of an open virtualization framework (OVF) virtual appliance utilizing a plug-in-based templatization framework. In one embodiment a method is provided which comprises storing an open virtualization package templatization framework on a data handling system, wherein the open virtualization package templatization framework comprises a plurality of product-specific add-ons. In the described embodiment, each of the plurality of product-specific add-ons comprises a discovery element to discover composite application instance components, an activation logic template element to generate an activation logic template specifying one or more scripts to configure a corresponding data handling system software product, and an open virtualization package envelope template element to specify an open virtualization package envelope template and logic to populate sections of an open virtualization package envelope.

The described method embodiment further comprises executing the plurality of product-specific add-ons against a first virtual composite application instance while the first virtual composite application instance is executing in a first virtualization platform environment to automatically generate an open virtualization package template; and deploying, utilizing the open virtualization package template, a second virtual composite application instance within a second virtualization platform environment. In another embodiment of the inventive subject matter, a computer program product is provided which comprises a computer readable storage medium having computer usable program code embodied therewith, the computer usable program code, when executed, causing a data handling system to perform one or more methods as described herein.

BRIEF DESCRIPTION OF THE DRAWINGS

The present embodiments may be better understood, and numerous objects, features, and advantages made apparent to those skilled in the art by referencing the accompanying drawings.

FIG. 5 depicts an activation logic publisher according to one or more embodiments of the inventive subject matter;

FIG. 6 depicts an OVF envelope publisher according to one or more embodiments of the inventive subject matter;

DESCRIPTION OF EMBODIMENT(S)

Figure 1:
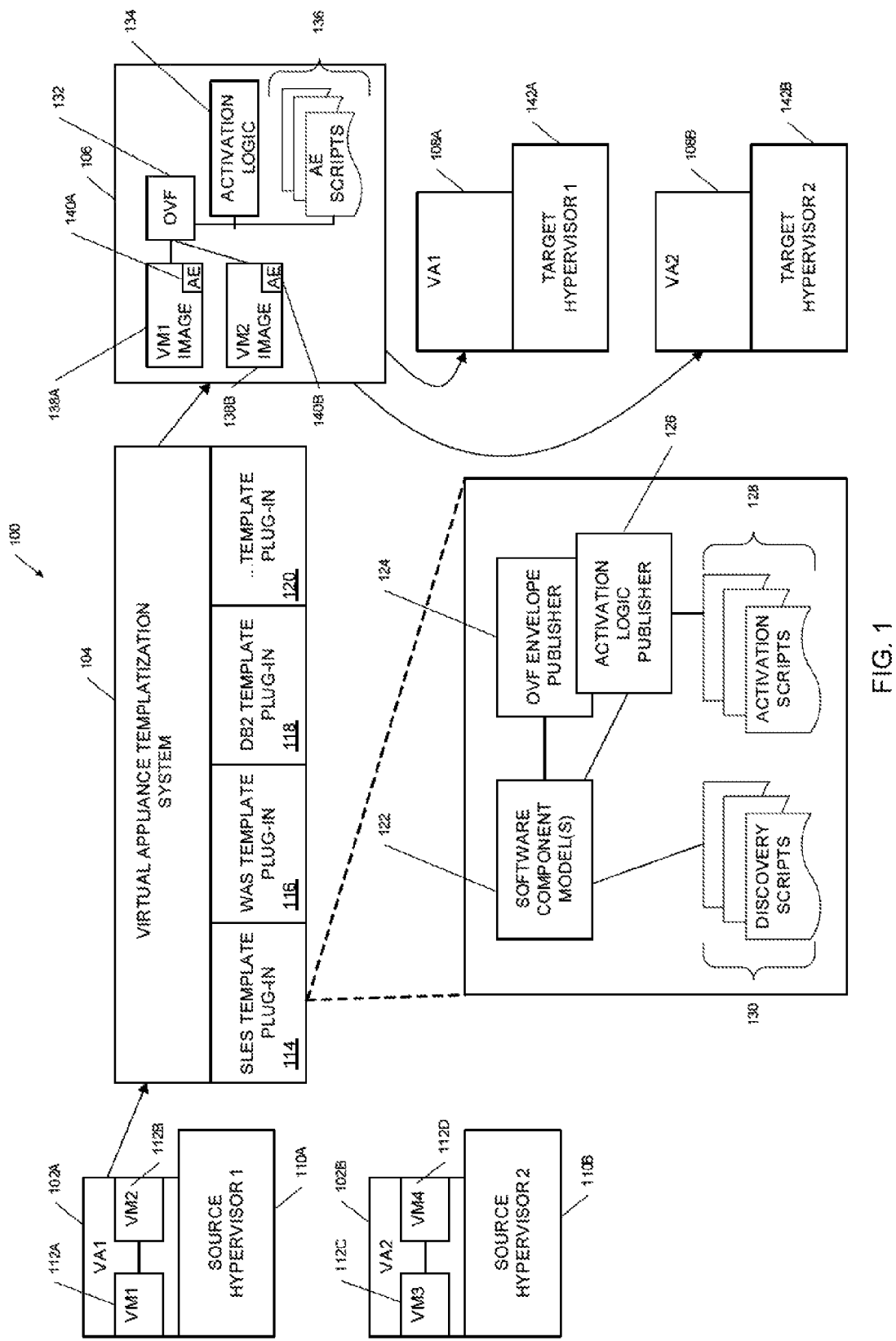
FIG. 1 depicts a high level conceptual diagram of a templatization architecture according to an embodiment of the inventive subject matter.

The description that follows includes example systems, methods, techniques, instruction sequences and computer program products that embody techniques of the present inventive subject matter. It will be understood however that the described embodiments may be practiced without these specific details. For instance, although examples refer to iteration through available plug-ins, in alternative embodiments iterations may be based on existing virtual machines comprising a virtual appliance. Similarly, although resource models are described as being generated using the Tivoli Common Data Model (CDM) language, in alternate embodiments other languages such as the Unified Modeling Language (UML), Common Information Model (CIM), Business Process Execution Language (BPEL) may be used to define or create such resource model. In other embodiments, other language consistent with the IT Infrastructure Library® (ITIL®) specification, Lightweight Directory Access Protocol (LDAP) directory schemas, and/or TeleManagement Forum (TMf) or Storage Networking Industry Association (SNIA) specifications. In other instances, well-known instruction instances, protocols, structures and techniques have not been shown in detail in order not to obfuscate the description.

Deployment is an important aspect of a software solutions' life-cycle and is repeatedly employed at many stages, including development, testing, delivery, and demonstration. Traditional script-based approaches for deployment are primarily manual and hence error prone, resulting in wasted time and labor. One or more embodiments of the invention provide a framework and approach for faster redeployment of distributed software solutions. In a non-limiting example, the solution is deployed on virtual machines using traditional methods. Environment-dependent configurations of the solution are discovered, and are preserved along with the images of virtual machines. For subsequent deployments, the preserved images are provisioned, and the entity performing deployment is provided an opportunity to change a subset of the recorded configurations that cannot be automatically derived; for example, IP addresses, ports, and the like. The remaining recorded configurations are derived by executing meta-model level constraints on the solution configuration model. The virtual machines are updated with new configurations by leveraging the semantics of appropriate scripts. One or more instances of the framework allow product experts to describe the configuration meta-model, constraints, and script semantics. This product knowledge is typically specified only once, and is reused across solutions for automatic configuration discovery and re-configuration. One or more embodiments of the invention reduce the time for repeated deployments of a solution; for example, from an order of weeks to an order of hours.

The skilled artisan will be familiar with virtualization technologies such as XEN® software (registered mark of XenSource, LLC, Palo Alto, Calif., USA) and VMWARE® software (registered mark of VMWare, Inc., Palo Alto, Calif., USA). Virtualization technologies make it possible to move a virtual machine (VM) from one physical host to another. This feature is leveraged by creating a VM image with the desired software once, and copying the image multiple times for replication on another host. In a VM-based redeployment approach, environment-independent configurations typically do not need to be changed during redeployment. There are a variety of environment dependent configuration types that deal with different functional and non-functional properties of a solution such as security, performance, and the like. One or more embodiments of the invention address configuration types that deployers may require to in order to make the solution work, or may otherwise like to change in a different network environment, e.g., IP Address, ports, passwords, and the like.

One or more embodiments of the invention leverage existing configuration discovery solutions for capturing the configuration model of a distributed solution deployed on VMs. Such existing solutions are per se known to the skilled artisan; one example is Tivoli Application Dependency Discovery Manager, http://www.ibm.com/software/tivoli/products/taddm/. Further, embodiments of the present invention provide a mechanism for product experts to describe relevant knowledge about configuration types, in addition to the configuration meta-model. The additional knowledge primarily includes the semantics of the constraints among configuration values and the semantics of scripts for updating software stacks.

In one or more instances of the invention, the distributed solution is first deployed and tested on a set of VMs in a laboratory environment, using traditional methods. The system then discovers the configuration model of the solution and preserves it along with the VM images. At the time of redeployment in a different environment, preserved images are provisioned and the entity undertaking deployment is provided an opportunity to change selective preserved configurations; for example, IP addresses, ports, usernames, passwords, and the like. The remaining preserved configurations are derived by executing constraints on the solution configuration model. The provisioned images are updated by executing appropriate scripts. The script semantics are leveraged for automated script execution.

Advantageously, one or more embodiments of the invention do not require a solution expert; product knowledge is leveraged to make the manual effort in preparing a solution for repeated deployments insignificant. One or more embodiments of the invention provide a framework for product experts to represent the relevant product knowledge at the configuration meta-model level, such that it is leveraged in an automated manner. This enables a wide variety of distributed software solutions for rapid redeployment. Also, this eliminates the need for the manual effort of a solution expert. Further, in one or more embodiments of the invention, product experts are only required to describe the knowledge about a few configuration types, thereby increasing practicality.

The skilled artisan will be familiar with so-called virtual appliances, that is, a network of virtual machines pre-installed and preconfigured with complex stacks of software, which aim to eliminate installation, configuration and maintenance costs, by minimizing human intervention. Virtual appliances are described in C. Sapuntzakis, et al., "Virtual appliances for deploying and maintaining software," Proceedings of the Seventeenth Large Installation Systems Administration Conference (LISA 2003). Embodiments of the present invention build on the notion of virtual appliances, additionally encapsulating environment dependent configurations, to help service providers to quickly deliver solutions including a wide variety of third party products and/or components.

One or more embodiments of the invention provide an extensible architecture, where the models are connected to the scripting world by relevant knowledge representation, and the values required by the scripts are automatically obtained from the models. Furthermore, unlike certain techniques limited to handling changes in IP address, one or more instances of the invention handle a wide range of variations in environments, including other parameter types such as ports, user names and/or passwords, and the like. Furthermore, one or more embodiments of the invention can be extended to handle topology changes during redeployment. The topology changes can be achieved, for example, by making multiple copies of the disk images and enabling few components in each copy. These kind of topology changes usually are applicable in a target environment where the deployer wants to distribute the components (earlier installed in single disk image) or for changing the cluster sizes, primarily for scale-out deployment, and so on.

One or more embodiments of the invention make use of the discovery of configuration items (CIs) and relationships among CIs across the software stack in a distributed environment. There are mature techniques and tools for discovering CIs and the relationships among them. A non-limiting example, with which the skilled artisan will be familiar, is Tivoli Application Dependency Discovery Manager (TADDM), http://www.ibm.com/software/tivoli/products/taddm/, a commercially available tool that discovers the various configurations and relationships, and stores them in a database. TADDM is available from International Business Machines Corporation, Armonk, N.Y., USA.

Figure 7:
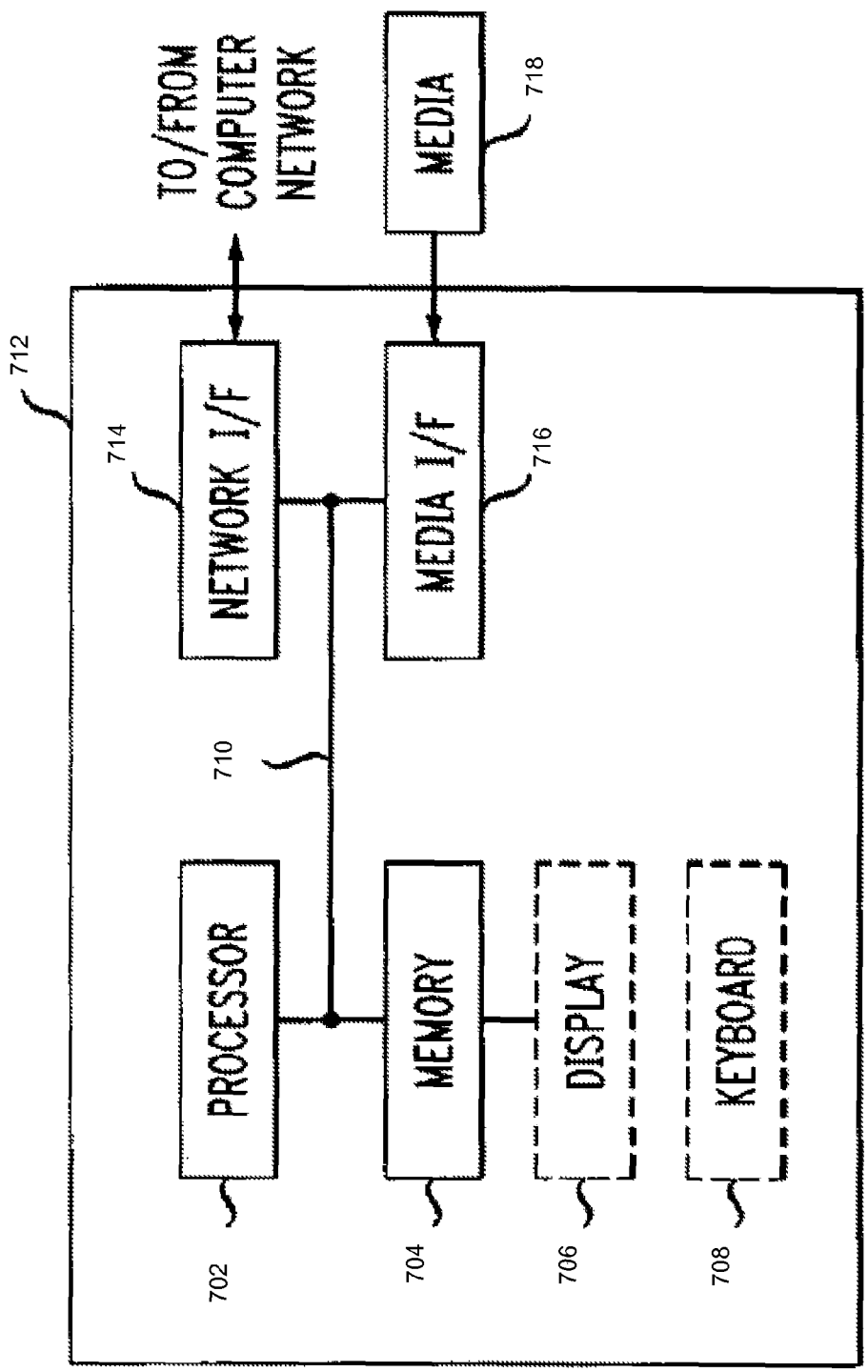
FIG. 7 depicts a computer system that may be useful in implementing one or more aspects and/or elements of an embodiment of the inventive subject matter.

According to one embodiment of the inventive subject matter a method is provided which comprises storing an open virtualization package templatization framework on a data handling system (e.g., a computer system as depicted and described herein with respect to FIG. 7), in the referenced embodiment, the open virtualization package templatization framework comprises a plurality of product-specific add-ons. An add-on (e.g., a snap-in, plug-in, extension, or theme) is a set of one or more software components that adds specific abilities to a larger "host" software application, in the embodiments described herein, the host software application may comprise any of a number of open virtualization format package authoring tools such as the OVF Toolkit available from International Business Machines Corporation, Armonk, N.Y., USA. In operation, a host software application may provide services to plug-ins via an application interface.

In the indicated embodiment, each of the plurality of product-specific add-ons comprises a number of elements which when executed against a running virtual composite application instance such as a virtual appliance automatically generate an open virtualization package template. A virtual composite application instance is deemed to be "running" if it is executing in a virtualization platform environment. In one embodiment, a virtualization package template comprises an open virtual appliance (OVA). In another embodiment such a package template comprises an open virtualization format (OVF) package which may be customized and deployed as further described herein. A product-specific add-on according to one embodiment comprises a discovery element to discover composite application instance components, an activation logic template element to generate an activation logic template specifying one or more scripts to configure a corresponding data handling system software product, and an open virtualization package envelope template element to specify an open virtualization package envelope template and logic to populate sections of an open virtualization package envelope. Utilizing the generated open virtualization package template, a second virtual composite application/virtual appliance instance may be deployed within a second virtualization platform environment. As used herein, a "template" comprises a reusable, potentially partially-populated or completed instance of a particular element.

FIG. 1 depicts a plug-in-based templatization framework for automating the creation of open virtualization framework (OVF) virtual appliance according to an embodiment of the inventive subject matter. The overall templatization architecture 100 illustrated in FIG. 1 includes a number of source virtual appliances 102*a*, 102*b*, virtual appliance templatization system 104, and an output or generated open virtualization package template (e.g., OVA 106) which, when deployed, may be used to generate any number of output target virtual appliances 108*a*, 108*b* as shown.

Source virtual appliances 102 each represent a running virtual appliance instance. Source virtual appliances 102 are each "composite applications" comprising multiple virtual machine images 112*a-d* providing different services and potentially disparate software stacks (e.g., virtualized operating systems, hardware platforms, etc.) but all executing in the same virtualization platform environment (e.g., virtual machine managers/hypervisors 110*a*, 110*b*). In alternative embodiments, virtual machine images (e.g., virtual machine images 112) of a single virtual appliance (e.g., virtual appliance 102A) may execute across different virtualization platform environments/hypervisors. In each source virtual appliance 102 of the embodiment of FIG. 1, virtual machines 112 have a number of connections, couplings, and interdependencies as shown. These interdependencies as well as other deep-level configuration aspects of complex composite virtual appliance are not sufficiently represented in conventional systems for the generation, duplication or migration of such virtual appliances to be performed in an automated way.

In one or more embodiments of the inventive subject matter, source virtual appliances 102 may be templatized using a virtual appliance templatization system 104 comprising a number of product-specific template plug-ins 114, 116, 118, and 120 as shown. Each product-specific plug-in includes a number of types of elements generated when the plug-in is created and/or registered with virtual appliance templatization system 104 including a discovery element to discover product components, their configuration properties and interdependencies, and further to build a resource model. In one embodiment, the indicated resource model is constructed using the Tivoli Common Data Model format. Each product-specific plug-in further includes an activation logic template which includes data describing scripts useable to configure an associated software product and its dependencies with other software products. This information is in turn applied to a discovered resource model to generate virtual appliance Activation Logic. Lastly, each product-specific plug-in comprises an OVF envelope template element which includes data specifying a template and logic for generation of OVF product sections from the discovered resource model.

In the illustrated embodiment of FIG. 1, a representative product-specific plug-in for a SUSE Linux Enterprise Server (SLES) operating system software product is shown in greater detail (SLES Template Plug-in 114). More specifically, SLES Template Plug-in 114 comprises a software component model 122 generated utilizing an OVF envelope publisher 124, an activation logic publisher 126, activation scripts 128, and discovery scripts 130 as will be described in greater detail herein. Software component model 122 of the embodiment of FIG. 1 is a detailed hardware and software model including data representing inter and intra-component dependencies. OVF envelope publisher 124 and activation logic publisher 126 include data specifying relationships between model elements, properties, discovery scripts 130 and activation scripts 128. Activation scripts 128 include scripts for setting component properties as well as starting and starting software components as desired during the software lifecycle.

The output of virtual appliance templatization system 104 of the illustrated embodiment of FIG. 1 is OVA 106. An open virtual appliance (OVA) file is a single archive file (typically TAR format) including all necessary OVF files necessary for deploying a virtual appliance using tooling which conforms to the Distributed Management Task Force (DMTF) OVF specification. A compliant OVF file or "template" includes an OVF descriptor (.ovf file extension), zero to one OVF manifest files (.mf file extension), zero to one OVF certification files (.cert file extension), and zero to N disk image files. The OVF descriptor is alternatively referred to as the OVF "envelope" and defines the content and requirements of the packaged virtual appliance in an XML-type format. A manifest file may contain digests for individual files in the OVF package to provide data integrity. A certification file may in turn be used to store a digital signature of a corresponding manifest file to ensure package authenticity.

In the embodiment of FIG. 1, OVA 106 comprises an OVF envelope 132, activation logic 134, activation engine scripts 136 and a number of constituent virtual machine images 138a, 138b, each including an activation engine element 140a, 140b. In one or more embodiments of the present inventive subject matter OVA 106 may be deployed to target hypervisors 142a, 142b in order to instantiate templatized source virtual appliances to selected virtualization platform environments as output target virtual appliances 108. Although a one-to-one association has been depicted in FIG. 1 with respect to target virtual appliances and virtualization platform environments (e.g., hypervisors) a target virtual appliance may include virtual machines distributed across separate and distinct virtualization environment platforms/hypervisors in alternative embodiments. OVF envelope 132 comprises a version indication defined by the XML namespace URI, a list of file references to all external files (e.g., virtual disk files, ISO images, and internationalization resources) that are part of the OVF package defined by the References element and its File child elements, appliance-level metadata defined by section elements detailing things such as networks and virtual disks, a description of the appliance content, which is either a single virtual machine (VirtualSystem element) or a collection of multiple virtual machines (VirtualSystemCollection element), and a specification of message resource bundles for zero or more locales defined by a Strings element for each locale.

Figure 2:
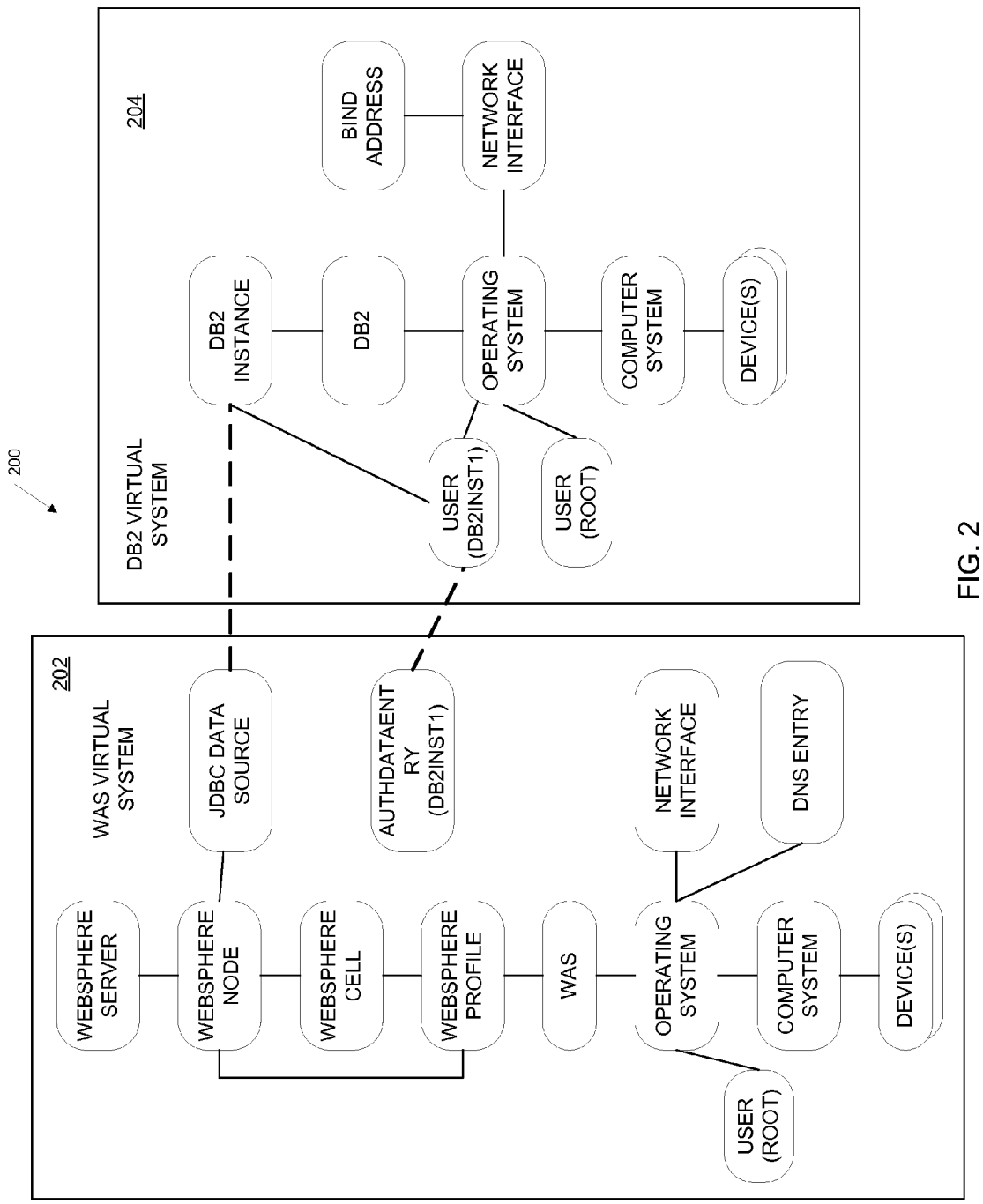
FIG. 2 depicts a resource model generated utilizing a discovery element according to one or more embodiments of the inventive subject matter.

FIG. 2 depicts a resource model 200 generated utilizing a discovery element according to one or more embodiments of the inventive subject matter. A first virtual machine contains a Websphere Application Server and the second contains a DB2 server. The components of these two servers have different intra and cross-VM dependencies. While a graphical representation has been provided, in alternative embodiments of the present inventive subject matter other resource model types may be provided so long as they may be traversed/executed against as described herein. In one embodiment, resource model 200 may be generated using the Tivoli Common Data Model (CDM) language to represent a collection of managed elements. Within the representative resource model of FIG. 2, two (virtual) machine comprising a virtual appliance are shown including a Websphere Application Server (WAS) server 202 and a DB2 database server 204. Managed elements and configuration items (CIs) within resource model 200 may be defined to be in one or more known relationships within respect to one another (e.g., "runsOn", "configuredOn", "pointsTo", "installedOn", or the like) as will be readily understood by those familiar with such data models and associated languages. Resource model 200 further includes a number of graphical links between its constituent elements to represent such relationships indicating both intra and inter-virtual machine dependencies.

The described and illustrated templatization architecture and resource model may be utilized according to one or more embodiments of the inventive subject matter to perform a templatization process as will be further described herein. In one embodiment, a templatization process includes a discovery phase or stage, a metadata generation phase and an image preparation/copy phase.

In a discovery phase the discovery scripts of all registered plug-ins are invoked on all the virtual machines composing a virtual appliance being templatized. The invocation of the described discovery scripts identifies or "discovers" constituent products, product configurations, dependencies, image locations, existing activation engine artifacts of a virtual appliance. These elements are used in turn to generate a model of all the resources executing on or otherwise associated with the specified virtual machines and their interdependencies. Any hardware resources so discovered are used to contribute to or populate the File References, Disk section, Virtual System, and Virtual Hardware section of a generated OVF envelope. In a metadata generation phase, the discovered resource model is traversed by the OVF Envelope Publisher of each registered plug-in. The result is a set of OVF Product Sections for each virtual machine/system in the OVF envelope of the virtual appliance template being generated. These product sections describe all application configuration parameter values that may be modified (e.g., by an administrator) when the virtual appliance is deployed. Similarly, the discovered resource model is traversed by the OVF Activation Logic Publisher of each registered plug-in. The result of this traversal is activation logic for each virtual machine/system of the virtual appliance template. The described activation logic is an input to an activation engine and defines the order in which the activation scripts need to be executed and how they are dependent on each other. In an image preparation/copy phase activation engine functionality (e.g., software code) is installed into the virtual machines composing the generated OVA as is activation logic and related scripts. The virtual machines are then stopped and their associated images and OVF envelope are copied into an image library (not shown).

Figure 3:
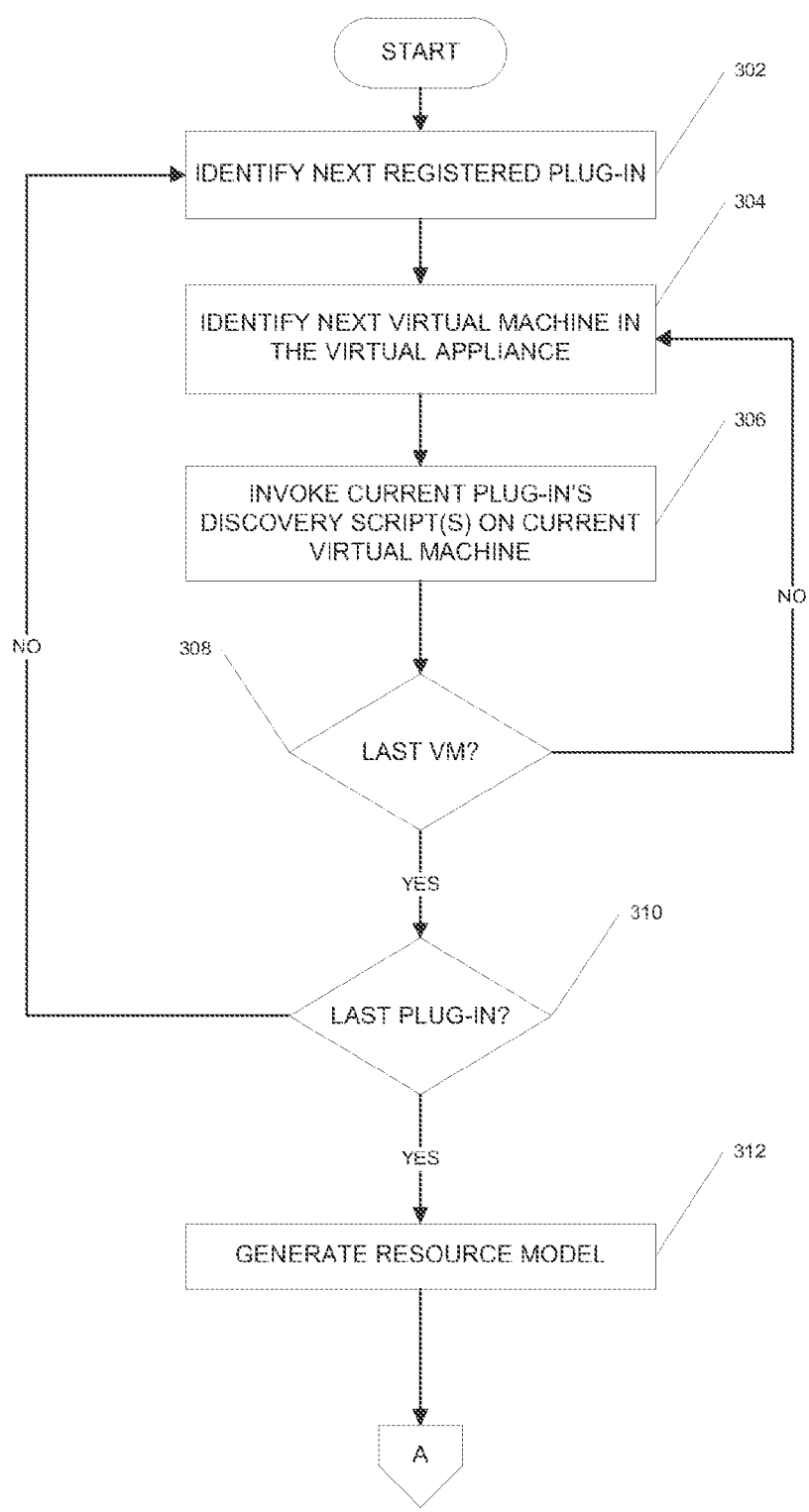
FIG. 3 depicts a high-level flowchart representation of a discovery process according to one or more embodiments of the inventive subject matter.

FIG. 3 depicts a high-level flowchart representation of a discovery process according to one or more embodiments of the inventive subject matter. Initially, in the illustrated process embodiment an initial or "next" registered plug-in is identified (process block 302) from among a number of plug-ins registered with a virtual appliance templatization framework or system. Thereafter, an initial or "next" virtual machine is identified (process block 304) from among those virtual machines composing a composite application/virtual appliance to be templatized. Discovery scripts of the "current" plug-in are then invoked on the "current" virtual machine (process block 306). A determination is then made whether a final or last virtual machine of a virtual appliance to be templatized has been processed (process block 308). If additional virtual machines remain to be processed, a next virtual machine of the virtual appliance to be templatized is identified via a return (process block 304), otherwise a determination is made whether additional registered plug-ins remain to be processed (process block 310). If additional plug-ins remain to be executed or invoked, a return is processed (process block 302) to restart the depicted process. Otherwise, discovered resources are utilized to generate or populate a resource model (process block 312) e.g., a resource model generated using or consistent with the Tivoli Common Data Model (CDM) before the depicted process embodiment continues via a transition to block A depicted in FIG. 4.

Figure 4:
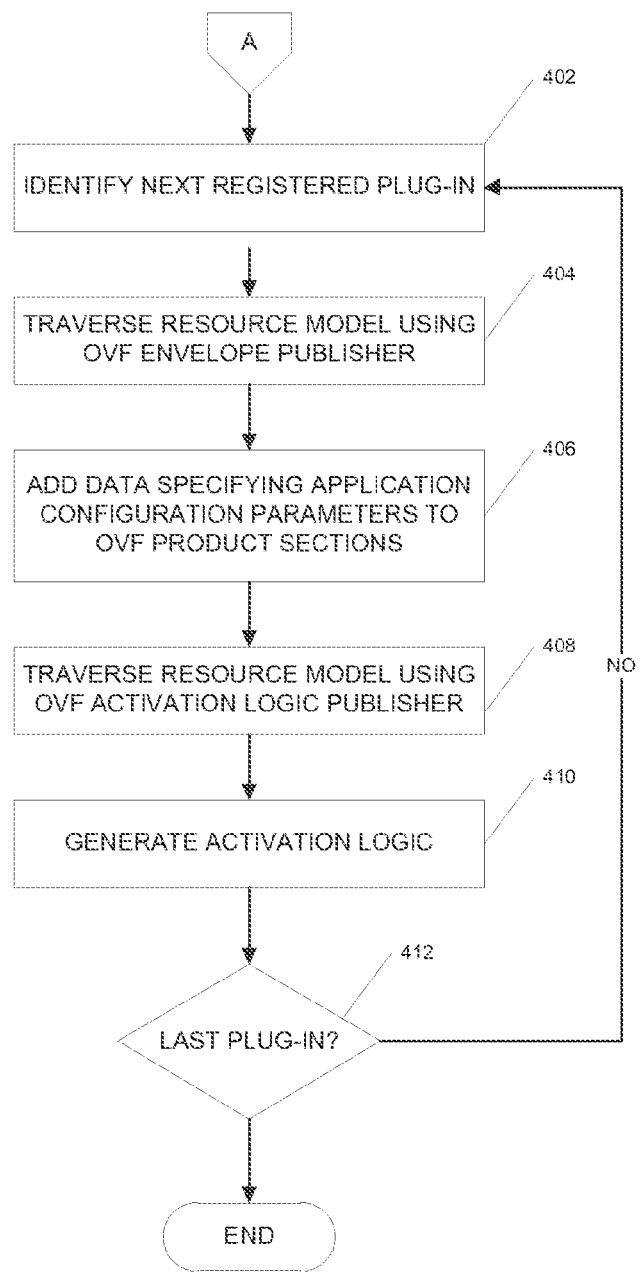
FIG. 4 depicts a high-level flowchart representation of a metadata generation process according to one or more embodiments of the inventive subject matter.

FIG. 4 depicts a high-level flowchart representation of a metadata generation process according to one or more embodiments of the inventive subject matter. Transitioning from the discovery process depicted in FIG. 3, the illustrated process embodiment begins by starting an iteration through registered plug-ins, identifying an initial or "next" registered plug-in for processing (process block 402) as shown. Thereafter, for the current plug-in being processed, a previously-generated resource model is traversed using an OVF envelope publisher (process block 404) (e.g., OVF envelope publisher 124 of FIG. 1). Data specifying application configuration parameters is added to corresponding OVF template product sections (process block 406). A second traversal is then performed using an OVF activation logic publisher (process block 408) (e.g., activation logic publisher 126 of FIG. 1) in order to generate necessary activation logic (process block 410). A determination is then made whether additional registered plug-ins remain to be processed (process block 412). If a positive determination is made, a return is performed (process block 402) in the depicted process order as shown. Otherwise the illustrated process of FIG. 4 is completed.

According to one embodiment of the inventive subject matter, a publishing operation (e.g., performed by OVF envelope publisher 124 of FIG. 1) is driven by a knowledge base (not shown) that specifies class-model level rules (for example, the "Websphere Server" and the "DB2 Instance" classes in FIG. 2). These rules, when applied to a discovered resource model, result in the generation of a distributed workflow (Activation Logic) and a set of configuration scripts that are orchestrated by that distributed workflow. The distributed workflow and scripts are duplicated within the (virtual) machines being templatized. An example XML implementation of an Activation Logic Publisher, useable to update a port of a DB2 instance such as that illustrated in FIG. 2, is described in greater detail in FIG. 5.

When applied to a resource model (e.g., resource model 200 of FIG. 2), the illustrated Activation Logic Publisher prepares a DB2 virtual system with a script (db2UpdatePort.pl) to update an associated DB2 instance port. The parameters for the script are obtained from the resource model by following paths starting from a DB2Instance object.

According to one embodiment, update tasks specify attributes that are updated by an underlying script. In the example Activation Logic Publisher of FIG. 5, the updatedAttributes="{port}" indicates that the port property of the indicated Db2 instance is updated by the db2HostNamePortUpdate.pl script. In one or more embodiments, this information is used to compute dependencies between tasks. A task that passes a resource model attribute as a parameter to its script will run after a task that updates the model attribute. In addition to the implicit dependencies identified as described above, tasks may specify explicit dependencies. A prerequisite tag within a command is utilized according to one embodiment to specify an explicit dependency for the command/task.

As in the activation logic publishing process, OVF product section publication is applied to a discovered resource model in order to generate the product sections for an OVF envelope. An example XML implementation of an OVF envelope publisher according to one or more embodiments of the inventive subject matter for generating software produce (e.g., DB2) instance product sections is depicted in FIG. 6. In one embodiment, all OVF publishers (e.g., OVF envelope publisher 124 of FIG. 2) begin instantation from a ComputerSystem object in a discovered resource model. In the example OVF envelope publisher illustrated herein and described above, application of the publisher to a the generated resource model in (e.g., resource model 200 of FIG. 2) generates or populates an OVF product section with the OVF class com.ibm.db2, containing a single Port property. During the OVF generation process, a mapping is generated between resource model properties and OVF properties. This map is used during publishing to link OVF properties to script parameters in one or more embodiments of the present invention.

FIG. 7 depicts a computer system that may be useful in implementing one or more aspects and/or elements of an embodiment of the inventive subject matter. A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device and that does not include a propagated signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RE, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a tangible propagation medium. Examples of a tangible computer-readable storage medium include a semiconductor or solid-state memory (for example memory 704), magnetic tape, a removable computer diskette (for example media 718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for virtual appliance generation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   storing an open virtualization package templatization framework on a data handling system, wherein said open virtualization package templatization framework comprises a plurality of product-specific add-ons, the plurality of product-specific add-ons associated with a plurality of products installed on a plurality of virtual machines in a virtual appliance, wherein a product-specific add-on of said plurality of product-specific add-ons comprises
      a discovery element to discover composite application instance components for a product associated with the product-specific add-on,
      an activation logic template element to generate an activation logic template specifying one or more scripts to configure a corresponding data handling system software product, and
      an open virtualization package envelope template element to specify an open virtualization package envelope template and logic to populate sections of an open virtualization package envelope;
   generating a resource model specifying the components of the composite application instance and interdependencies between said components utilizing said discovery element; and
   executing said plurality of product-specific add-ons to automatically generate an open virtualization package template, wherein executing the activation logic template element includes:
      determining, based on the resource model, a first script that is used to determine a property of the product-specific add-on,
      determining dependencies for the one or more scripts, wherein determining the dependencies includes determining that a second script that utilizes the property is executed after the first script; and
      generating activation logic specifying an order of execution of the one or more scripts based on the dependencies.

2. The method of claim 1, wherein executing said plurality of product-specific add-ons further comprises:

executing said plurality of product-specific add-ons against said resource model.

3. The method of claim 2, wherein,
said method further comprises instantiating an activation engine within each of a plurality of virtual machine images of said composite application instance; and
executing said plurality of product-specific add-ons further comprises,
generating said one or more scripts to configure said corresponding data handling system software product for each of said plurality of product-specific add-ons.

4. The method of claim 2, wherein said open virtualization package template comprises an open virtualization format (OVF) open virtual appliance (OVA) file.

5. The method of claim 4, wherein executing said plurality of product-specific add-ons further comprises:
populating one or more of a File References Section, a Disk Section, a Virtual System Section, and a Virtual Hardware Section of an OVF envelope of said OVA file utilizing one or more discovery elements of said plurality of product-specific add-ons; and
populating one or more Product Sections of said OVF envelope of said OVA file utilizing one or more open virtualization package envelope template elements of said plurality of product-specific add-ons.

6. The method of claim 2, wherein generating said resource model comprises:
generating said resource model specifying components of said composite application instance and interdependencies between said components utilizing a Common Data Model (CDM) information model.

7. The method of claim 1, said method further comprising:
receiving data specifying an additional product-specific add-on; and
including said additional product-specific add-on to said plurality of product-specific add-ons.

8. A computer program product comprising a computer-readable storage medium having computer-usable program code embodied therewith, the computer-usable program code, when executed by a computer system, causes said computer system to perform operations comprising:
storing an open virtualization package templatization framework on a data handling system, wherein
said open virtualization package templatization framework comprises a plurality of product-specific add-ons, the plurality of product-specific add-ons associated with a plurality of products installed on a plurality of virtual machines in a virtual appliance,
wherein a product-specific add-on of said plurality of product-specific add-ons comprises
a discovery element to discover composite application instance components for a product associated with the product-specific add-on,
an activation logic template element to generate an activation logic template specifying one or more scripts to configure a corresponding data handling system software product, and
an open virtualization package envelope template element to specify an open virtualization package envelope template and logic to populate sections of an open virtualization package envelope;
generating a resource model specifying the components of the composite application instance and interdependencies between said components utilizing said discovery element; and executing said plurality of product-specific add-ons to automatically generate an open virtualization package template, wherein executing the activation logic template element includes:
determining, based on the resource model a first script that is used to determine a property of the product-specific add-on,
determining dependencies for the one or more scripts, wherein determining the dependencies includes determining that a second script that utilizes the property is executed after the first script; and
generating activation logic specifying an order of execution of the one or more scripts based on the dependencies.

9. The computer program product of claim 8, wherein executing said plurality of product-specific add-ons further comprises:
executing said plurality of product-specific add-ons against said resource model.

10. The computer program product of claim 9, wherein,
said operations further comprise instantiating an activation engine within each of a plurality of virtual machine images of said composite application instance; and
executing said plurality of product-specific add-ons further comprises,
generating said one or more scripts to configure said corresponding data handling system software product for each of said plurality of product-specific add-ons.

11. The computer program product of claim 9, wherein said open virtualization package template comprises an open virtualization format (OVF) open virtual appliance (OVA) file.

12. The computer program product of claim 11, wherein executing said plurality of product-specific add-ons further comprises:
populating one or more of a File References Section, a Disk Section, a Virtual System Section, and a Virtual Hardware Section of an OVF envelope of said OVA file utilizing one or more discovery elements of said plurality of product-specific add-ons; and
populating one or more Product Sections of said OVF envelope of said OVA file utilizing one or more open virtualization package envelope template elements of said plurality of product-specific add-ons.

13. The computer program product of claim 9, wherein generating said resource model comprises:
generating said resource model specifying components of said composite application instance and interdependencies between said components utilizing a Common Data Model (CDM) information model.

14. The computer program product of claim 8, said operations further comprising:
invoking at least a portion of said open virtualization package template in response to a deployment of said open virtualization package template within a second virtualization platform environment.

15. The computer program product of claim 8, said operations further comprising:
receiving data specifying an additional product-specific add-on; and
including said additional product-specific add-on to said plurality of product-specific add-ons.

16. A data handling system comprising:
a processor; and
a memory coupled to said processor to store computer-useable program code, which when executed by said processor, causes said processor to:

store an open virtualization package templatization framework on said data handling system, wherein said open virtualization package templatization framework comprises a plurality of product-specific add-ons, the plurality of product-specific add-ons associated with a plurality of products installed on a plurality of virtual machines in a virtual appliance, wherein a product-specific add-on at least one of said plurality of product-specific add-ons comprises a discovery element to discover composite application instance components for a product associated with the product-specific add-on, an activation logic template element to generate an activation logic template specifying one or more scripts to configure a corresponding data handling system software product, and an open virtualization package envelope template element to specify an open virtualization package envelope template and logic to populate sections of an open virtualization package envelope;

generate a resource model specifying the components of the composite application instance and interdependencies between said components utilizing said discovery element; and execute said plurality of product-specific add-ons to automatically generate an open virtualization package template, wherein execution of the activation logic template element includes:

determine, based on the resource model, a first script that is used to determine a property of the product-specific add-on, determine dependencies for the one or more scripts, wherein determining the dependencies includes determining that a second script that utilizes the property is executed after the first script; and generate activation logic specifying an order of execution of the one or more scripts based on the dependencies.

\* \* \* \* \*